United States Patent
Sawin et al.

(10) Patent No.: US 6,982,819 B2
(45) Date of Patent: Jan. 3, 2006

(54) ELECTRO-OPTIC ARRAY INTERFACE

(75) Inventors: Ray Sawin, Collinsville, CT (US);
Salvador M. Fernández, Hartford, CT (US)

(73) Assignee: Ciencia, Inc., East Hartford, CT (US)

( * ) Notice: Subject to any disclaimer, the term of this patent is extended or adjusted under 35 U.S.C. 154(b) by 0 days.

(21) Appl. No.: 10/875,707

(22) Filed: Jun. 24, 2004

(65) Prior Publication Data

US 2005/0248830 A1    Nov. 10, 2005

Related U.S. Application Data

(63) Continuation-in-part of application No. 10/842,366, filed on May 10, 2004.

(51) Int. Cl.
*G02F 1/03*    (2006.01)
*G02F 1/29*    (2006.01)
*G02F 1/035*   (2006.01)
*G02B 27/44*   (2006.01)
*G01R 31/308*  (2006.01)

(52) U.S. Cl. .............. 359/245; 359/247; 359/248; 359/299; 359/563; 324/753; 385/2; 385/123

(58) Field of Classification Search ........ 359/245–248, 359/276, 299, 563, 566, 572; 324/753; 385/2, 385/123; 435/6, 7.1
See application file for complete search history.

(56) References Cited

U.S. PATENT DOCUMENTS

| | | | |
|---|---|---|---|
| 5,067,788 A * | 11/1991 | Jannson et al. ................ 385/2 |
| 5,078,479 A | 1/1992 | Vuilleumier ................ 359/290 |
| 5,157,537 A * | 10/1992 | Rosenblatt .................. 359/245 |
| 5,157,541 A * | 10/1992 | Schildkraut et al. ........ 359/276 |
| 5,212,583 A | 5/1993 | Vali et al. ................... 359/245 |
| 5,337,183 A * | 8/1994 | Rosenblatt .................. 359/248 |
| 6,034,807 A | 3/2000 | Little et al. ................. 359/227 |
| 6,271,671 B1 * | 8/2001 | Charles et al. .............. 324/753 |
| 6,411,272 B1 | 6/2002 | Edwards ..................... 345/87 |
| 6,529,277 B1 | 3/2003 | Weitekamp ................. 356/445 |
| 6,549,685 B2 * | 4/2003 | Marks et al. .................. 385/2 |
| 6,611,367 B1 * | 8/2003 | Naya et al. ................. 359/299 |
| 6,654,156 B1 | 11/2003 | Crossland et al. .......... 359/290 |
| 6,768,666 B2 | 7/2004 | Tsu ............................ 365/113 |
| 6,813,063 B2 | 11/2004 | Ishihara ..................... 359/320 |
| 6,888,515 B2 | 5/2005 | Bekey ........................ 343/912 |
| 2004/0046963 A1 | 3/2004 | Lackritz et al. ............. 356/445 |

* cited by examiner

*Primary Examiner*—Loha Ben
(74) *Attorney, Agent, or Firm*—Alix, Yale & Ristas, LLP

(57) ABSTRACT

A grating coupled surface plasmon resonance optical modulator is disclosed. A electro-optic polymer dielectric is deposited on the metallic surface of a diffraction grating to provide a metal/dielectric interface. A surface plasmon will propagate at the metal/dielectric interface in a resonant condition, e.g., when the metal surface is illuminated by transverse magnetic (TM) polarized light of the appropriate wavelength, angle of incidence and phase velocity. In the present invention, phase velocity is controlled by the diffraction grating. A transparent electrode deposited on the electro-optic layer allows an electrical potential to be applied across the electro-optic polymer. The applied electrical potential (voltage) changes the index of refraction of the electro-optic polymer, thereby disrupting the resonant condition to produce an optically detectable change in reflectance of incident light from the metal layer. The disclosed grating coupled surface plasmon resonance optical modulator may be configured as an electronically or optically addressable array.

20 Claims, 7 Drawing Sheets

ELECTRO-OPTIC ARRAY INTERFACE

CROSS REFERENCE TO RELATED APPLICATIONS

This application is a continuation-in-part of U.S. patent application Ser. No. 10/842,366, filed May 10, 2004.

STATEMENT REGARDING FEDERALLY SPONSORED RESEARCH OR DEVELOPMENT

This invention was made with United States Government support under grant number DMI0215098. The United States Government has certain rights to this invention.

FIELD OF THE INVENTION

The present invention relates generally to interconnections between electronic chips or devices and more specifically to an electro-optic modulator for use as an interface between electronic components and optical communication pathways.

BACKGROUND OF THE INVENTION

At present, microprocessors are providing on-chip clock frequencies on the order of 1 GHz. The International Technology Roadmap for Semiconductors (ITRS) forecasts on-chip clock rates of about 10 GHz in 2011. Performance in the GHz range can only be fully exploited if the off-chip interconnection technology provides appropriate bandwidth, a constraint that will become increasingly more severe during the next ten years. This means that the challenge of routing signals off-chip and into the system in the GHz frequency range is expected to exceed that of achieving on-chip performance at these frequencies. In addition, highly parallel, next-generation computational systems will require highly dense connection networks containing many long-distance connections. In such highly connected, highly parallel systems, the module-to-module and long distance chip-to-chip connections are responsible for the majority of the power dissipation, time delay and surface area. Thus, it has become critically important to minimize the area, power and time delay of the chip-to-chip and module-to-module interconnects while, at the same time, increasing density and bandwidth. The Semiconductor Industry Association (SIA) has recognized these challenges and identifies interconnects as the primary chip-related technology with the largest potential technology gaps.

By replacing electrical intramodule and module-to-module connections with optical communication links, the communication bottleneck can be relieved. In recent years considerable R&D effort has been devoted to developing optical chip-to-chip interconnects to reduce this microelectronics interconnection problem. It has now been demonstrated that optical interconnects have the potential to increase communication speed and reduce the volume, crosstalk and power dissipation of the connections.

Despite recent progress and the demonstrated potential of optical interconnects, this technology is still at an early stage and practical realization of its potential will require more efficient approaches and further improvements in performance. In particular, there is a need for reconfigurable interconnect technologies capable of higher density of connections while reducing power, area and cost.

The phenomenon of surface plasmon resonance (SPR) provides the basis for the proposed interconnect microarray. When a metal surface is illuminated by transverse magnetic (TM)-polarized light of the appropriate wavelength, angle of incidence and phase velocity, a resonance condition occurs and energy from the light is coupled into the electrons of the metal to excite what is called a surface plasmon. A surface plasmon is a propagating electron density oscillation in a metal at a metal/dielectric interface. The associated electromagnetic fields constitute a guided surface mode of the conductor-dielectric interface and are evanescent in each medium with intensity decaying exponentially away from the surface. Penetration into the dielectric depends on the wavelength of the incident light and is typically of the order of a few hundred nm. When the conductor is a high-conductivity metal such as silver or gold and with air as the dielectric, the enhancement of the field intensity at the plasmon interface over that of the incident beam is about two orders of magnitude. A large fraction of the plasmon field energy lies in the dielectric, where it is available for sensing or modulation purposes.

The resonance condition (at which incident light couples into the surface plasmon) is manifested by a large fall in reflectance of the incident beam, the energy of which is transferred to the surface plasmon. The SPR resonance condition depends on the wavelength of the incident light, the angle of incidence and the index of refraction at the metal/dielectric interface. Surface plasmons cannot be directly excited by illuminating an isolated planar metal surface. The reason is that the phase velocity of the surface plasmon is slower than that of light and therefore their wave vectors cannot be matched to achieve resonance. This problem is typically circumvented by using the so-called prism-coupled technique, or Kretschmann configuration. In this method, a gold film is vapor-deposited onto a high-index glass prism. Illumination of the gold layer is performed through the prism at an angle greater than the critical angle for total internal reflection. The high index of refraction of the prism reduces the phase velocity of light. Under these conditions the surface plasmon can be excited by the evanescent light wave at the prism/metal interface. FIG. 2 shows a typical prism-coupled SPR arrangement.

A more practical alternative to prism coupling is grating-coupling. This is implemented by coating a diffraction grating with a thin film of a high-conductivity metal (exemplary materials are silver or gold). A diffraction grating is a periodically modulated interface between two media of different optical properties. A light wave incident on a grating is diffracted into various orders. With proper selection of incidence angle, wavelength of the incident light and grating periodicity, a higher diffracted order can be phase matched to the surface plasmon wave, as illustrated in FIG. 3. Grating coupling permits direct illumination of the metal surface and obviates the need for the cumbersome prism.

Until recently, most SPR systems have been based on prism coupling. Light modulation by prism-coupled SPR has been used for the study of voltage-dependent alignment in liquid crystals and a prism-coupled surface plasmon spatial light modulator based on a liquid crystal has been reported. The lack of grating-coupled systems has been primarily due to the greater complexity of fabrication that was previously required to make gratings. However, recent technological advances have reversed this situation. Plastic optical gratings can now be mass-produced at very low cost using the same technology that is used to produce digital video disks (DVDs) or compact disks (CDs) and could be formed in spin cast layers. Recently, the pharmaceutical industry developed a microarray-based grating-coupled SPR biosensor system for proteomics applications employing such a diffraction grating. This system is capable of massively-parallel detection of hundreds to thousands of protein binding events and of monitoring binding kinetics in real time.

Due to factors such as cost, physical size and additional necessary mounting hardware, the prism coupler is unsuitable for mass-produced, compact optical interconnects. Grating coupling, on the other hand, has significant advantages for optical interconnect applications in terms of size, cost and configuration flexibility. In addition, it allows smaller angles of incidence and hence increased aperture, provides greater spatial uniformity and permits higher refractive index electro-optical (EO) materials to be used. In addition, it enables easier integration with circuit boards, modules and integrated circuits.

SUMMARY OF THE INVENTION

One embodiment of the proposed invention is a dynamically reconfigurable, high-density, electro-optic array interface based on the phenomenon of grating-coupled surface plasmon resonance (SPR). The electro-optic array interface includes three primary components: an illumination source, a spatially modulatable planar reflector microarray, and a detector array. Each modulatable reflector and detector form a grating coupled SPR optical modulator for translating an electronic signal into an optical signal. In the inventive grating coupled SPR optical modulator, an electro-optic polymer dielectric is deposited on the metallic surface of a diffraction grating to provide a metal/dielectric interface. A surface plasmon will propagate at the metal/dielectric interface in a resonant condition, e.g., when the metal surface is illuminated by transverse magnetic (TM) polarized light of the appropriate wavelength, angle of incidence and phase velocity. A transparent electrode deposited on the electro-optic layer allows an electrical potential to be applied across the electro-optic polymer. The applied electrical potential (voltage) changes the index of refraction of the electro-optic polymer, thereby disrupting the resonant condition to produce an optically detectable change in reflectance of incident light from the metal layer.

The illumination source may be a single source, allowing relatively low power compared to other interconnect approaches, or an array (LED or laser diode), depending on the implementation. The reflector microarray contains N discrete elements that are electronically addressable in parallel and whose reflecting properties are thus modulated to change the reflected intensity of an incident optical beam. The SPR microarray divides the incident light into N beams (to provide a fanout factor of N), and directs each beam onto the appropriate element of the detector array. With this device optical connections may be made between chips within a given module or between chips located on different modules. The ultimate interconnection density (number of microarray elements, N, per unit area) that can be achieved in practice remains to be established; however, densities of the order of 10,000 per $cm^2$ should be feasible and values several-fold larger may be possible. In addition to this high interconnect density, the proposed technology could, in principle, reach modulation or switch rates of the order of tens of GHz.

The inventive electro-optic array interface exploits the exquisite sensitivity of SPR to the index of refraction of the dielectric layer at the metal-dielectric interface. By depositing a dielectric film of electro-optic (EO) polymer whose refractive index can be electrically controlled, the resonance condition for coupling incident light into surface plasmons (and hence, surface reflectance) can be modulated in a controlled manner.

The inventive electro-optic array interface may be electronically or optically addressable. That is, modulation of pixel reflectance may be achieved by directly applying an electrical signal to the control electrodes to provide an electrically addressable array. The microarray could also be implemented as an optically addressable device by connecting the control electrodes to the voltage source through photoconducting gates made from a photoconducting material, such as amorphous silicon (see FIG. 5). Addressing would then be accomplished by illuminating the appropriate photoconducting gates with a write beam. In this embodiment, chips containing laser diode arrays would provide the write beams for optical addressing of the modulator array.

DETAILED DESCRIPTION OF THE PREFERRED EMBODIMENT

Figure 1:
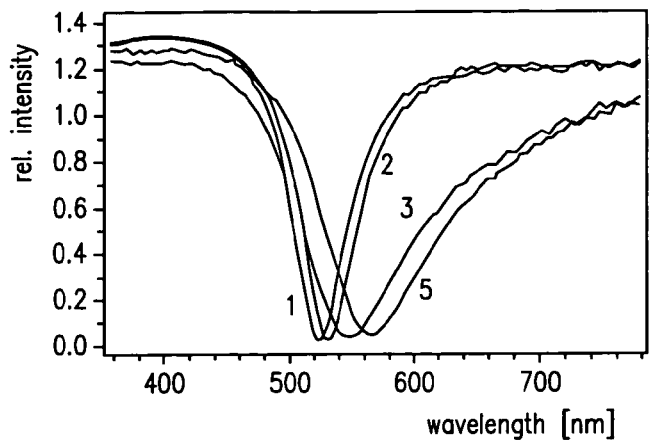
FIG. 1 illustrates SPR curves from a prior art biosensor illuminated with collimated broadband light indicating the wavelength corresponding to the reflectance minimum.
Figure 2:
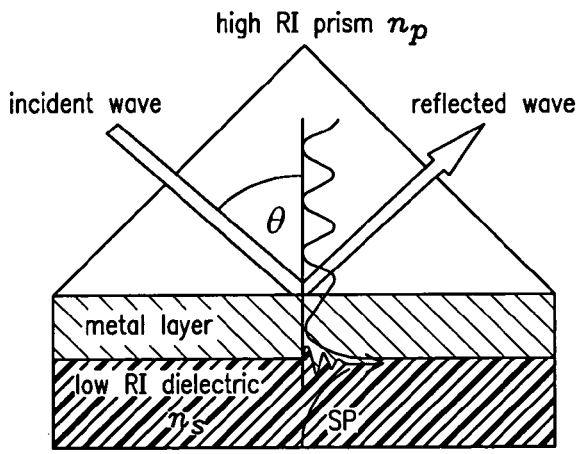
FIG. 2 illustrates a prior art prism coupled, or Kretschmann configuration.
Figure 3:
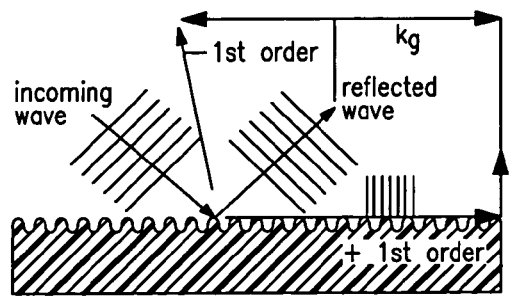
FIG. 3 illustrates a grating coupled surface plasmon configuration.
Figure 4:
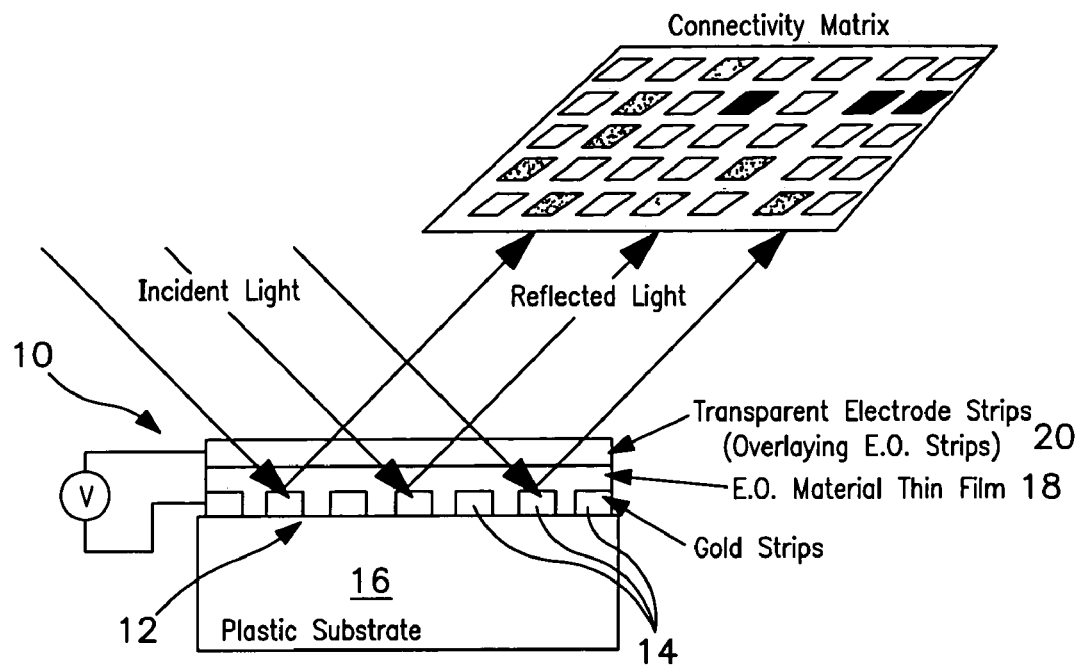
FIG. 4 illustrates an electronically addressable grating coupled surface plasmon resonance array according to aspects of the present invention.
Figure 5A:
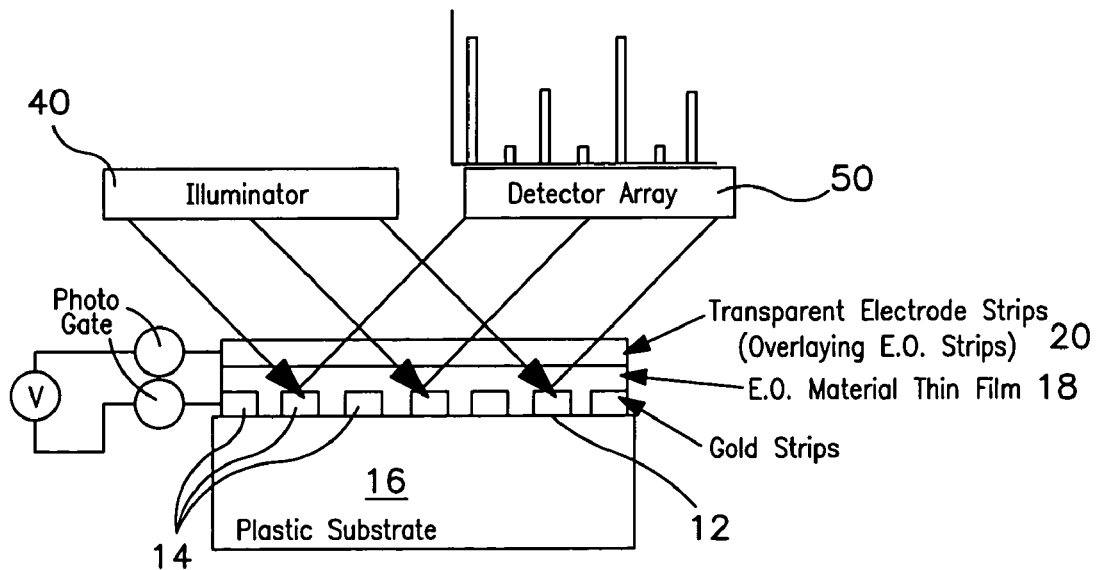
FIGS. 5A and 5B are side and top views, respectively, of an optically addressable grating coupled surface plasmon resonance array according to aspects of the present invention.
Figure 5B:
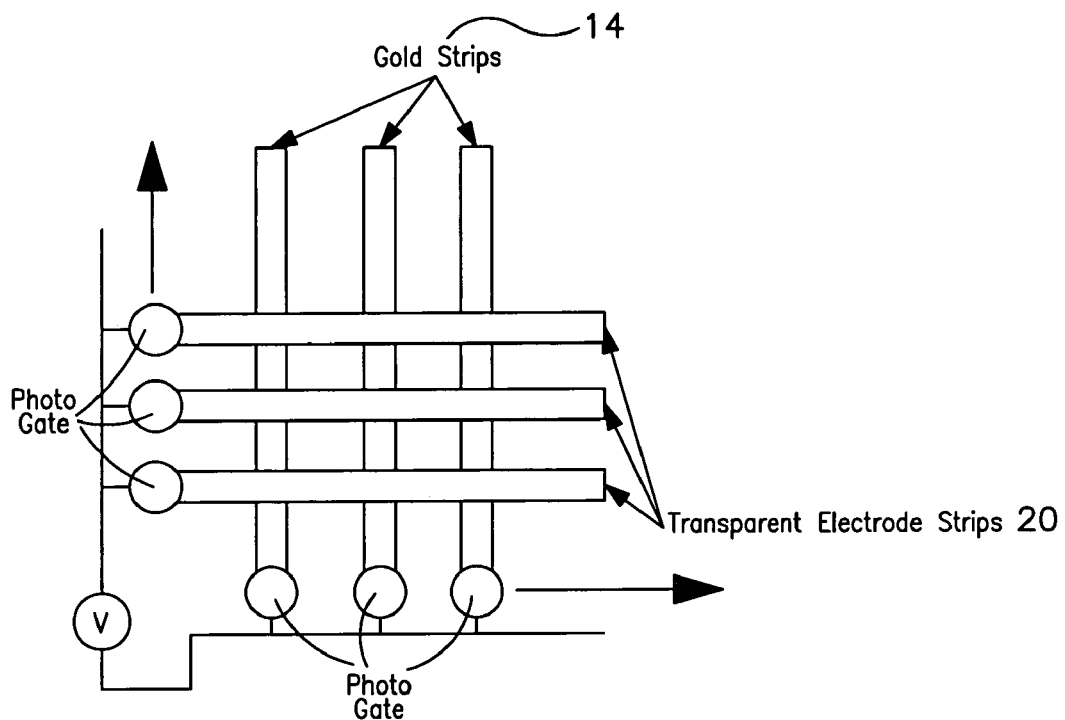

An embodiment of the electro-optic array interface 10 includes a diffraction grating 12 onto which a gold electrode array of strips 14 along the X-direction is deposited (the grating may be formed on a substrate material other than plastic, e.g. silicon or resin) as shown in FIGS. 4, 5A and 5B. In the context of the present invention, the diffraction grating 12 is a repeating pattern of parallel microgrooves on a dielectric substrate 16 such as plastic or silicon. The width of the gold electrodes 14 (exaggerated in FIGS. 4, 5A and 5B) should be of the order of the plasmon propagation length (~20 μm). Above this gold array is deposited a thin film 18 of the EO polymer that forms the dielectric, and which should be at least 0.1 μm thick to maximize its interaction with the plasmon field. The inventors believe the thickness of the EO layer 18 can be optimized, with a goal of decreasing this thickness to allow the EO polymer layer 18 to be formed by self-assembly deposition techniques. The thickness of the gold layer forming the electrodes 14, which is also exaggerated in the Figures, may be thicker than the extremely thin gold layer required for a the prior art prism coupled SPR modulators shown in FIG. 2. An example of a gold electrode thickness that functions well in the context of the present invention is approximately 80 nm. Flexibility as to the thickness of the gold electrodes reduces cost by loosening the demand for the close tolerance, extremely thin gold layer required for the Kretschmann configuration shown in FIG. 2.

A second, transparent, electrode array of (e.g. conducting polymer or Indium Tin Oxide—ITO) stripes 20 in the Y-direction substantially perpendicular to the gold electrodes 14 is applied over the EO dielectric layer 18. With this architecture any pixel in the EO array is locally addressable by applying a potential difference V between any X-Y electrode pair. Induced changes in the dielectric constant of the polymer layer 18 at each pixel locally shift the plasmon resonance condition, thereby shifting or otherwise distorting the reflectivity curve. If the array is illuminated with an expanded collimated, transverse magnetic (TM)-polarized beam at an angle near resonance, the reflected beam can be spatially and temporally modulated in a pattern corresponding to the on-off pattern of the microarray pixels. In FIG. 5A, an illuminator 40, which may be an LED or Laser Diode, generates an appropriate incident light. A detector array 50 is arranged to detect changes in the reflected light from the optical modulator formed between each X-Y electrode pair. The detector array 50 may include, but is not limited to, a photodiode array, a CCD or a CMOS camera.

Figure 6:
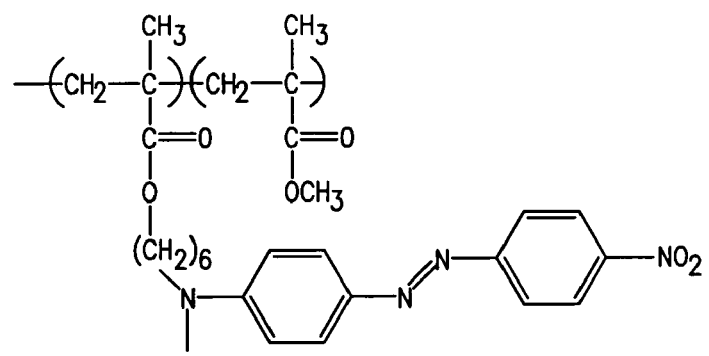
FIG. 6 shows the chemical structure of an electro-optic polymer according to aspects of the present invention.

The purpose of the EO polymer layer 18 in the proposed grating coupled SPR modulators that form the basic component of the electro-optic array interface 10 is to provide an electric field-dependent change in refractive index at the metal-dielectric interface. For a significant index perturbation to be realized with the application of a small voltage V, the electron configurations of the material must be highly polarizable. Therefore, π-electron materials, such as organic chromophores are promising candidates. For experimental purposes, a side-chain nonlinear optical polymer system was selected since a larger nonlinear coefficient and improved thermal stability of the poled order can be obtained if the nonlinear chromophore is chemically attached to the polymer backbone, as compared to a guest-host polymer system. Among various side-chain nonlinear polymers reported to date, polymethylmethacrylate with a pendant N-methylamino-4'-nitroazobenzene chromophore was chosen because this polymer possesses (1) a good electro-optic coefficient and (2) a glass transition temperature of just below 100° C., which is required to prevent thermal deformation of the plastic diffraction grating substrate during polymer film processing. This polymer was synthesized as is known in the art. Its chemical structure is shown in FIG. 6.

The light absorption maximum for this material, determined by UV-VIS spectrometer (Lambda 900, Perkin Elmer) is 500 nm. The glass transition temperature ($T_g$) of the polymer, determined by Differential Scanning Calorimeter (DSC 2920, TA Instrument) at a heating rate of 10° C./min, is 93° C.

Important parameters for the diffraction grating substrate 16 and gold electrodes 14 include substrate material, grating periodicity, grating groove depth and thickness of the gold layer forming the electrodes 14. Grating periodicity, in turn, depends on wavelength and angle of incidence of the excitation light. Because the fabrication of a master grating was beyond the scope of the proof of concept experimentation, the feasibility demonstration was carried out using grating coupled surface plasmon resonance (GCSPR) chips that were previously developed for biosensing applications.

Figure 7:
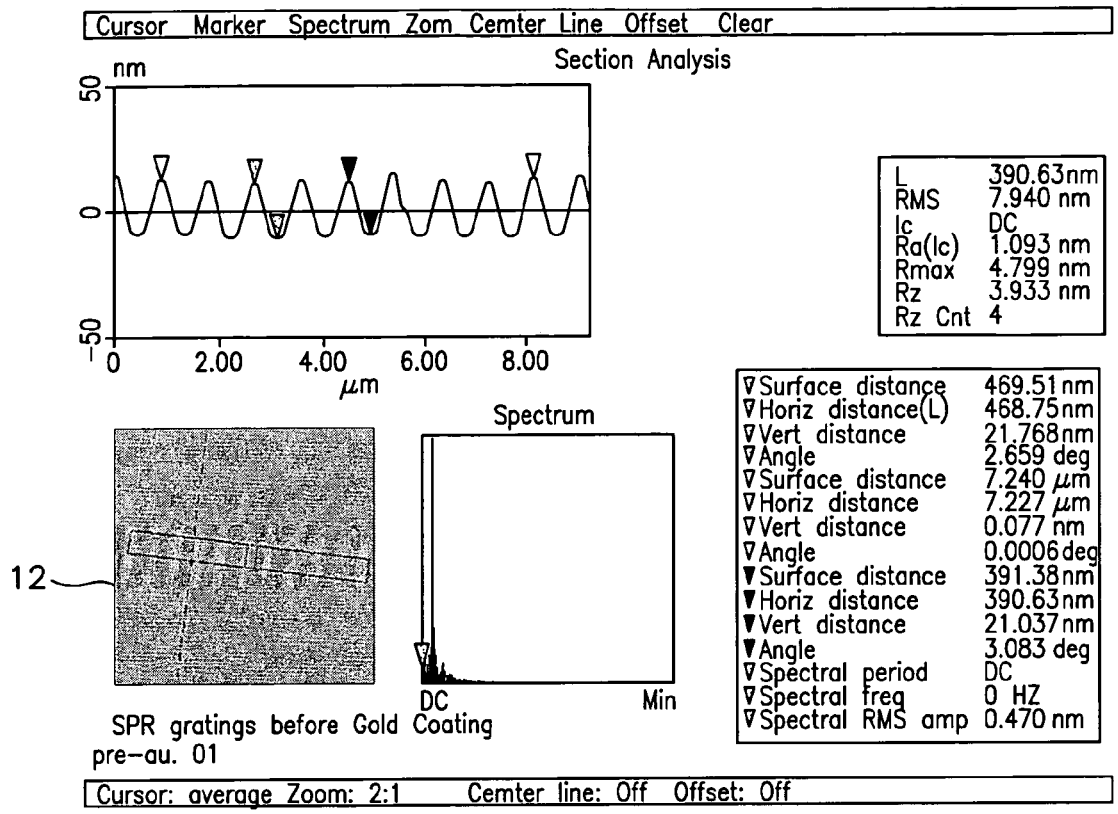
FIG. 7 shows an atomic force microscopy characterization of a plastic diffraction grating prior to application of metal film according to aspects of the present invention.
Figure 10A:
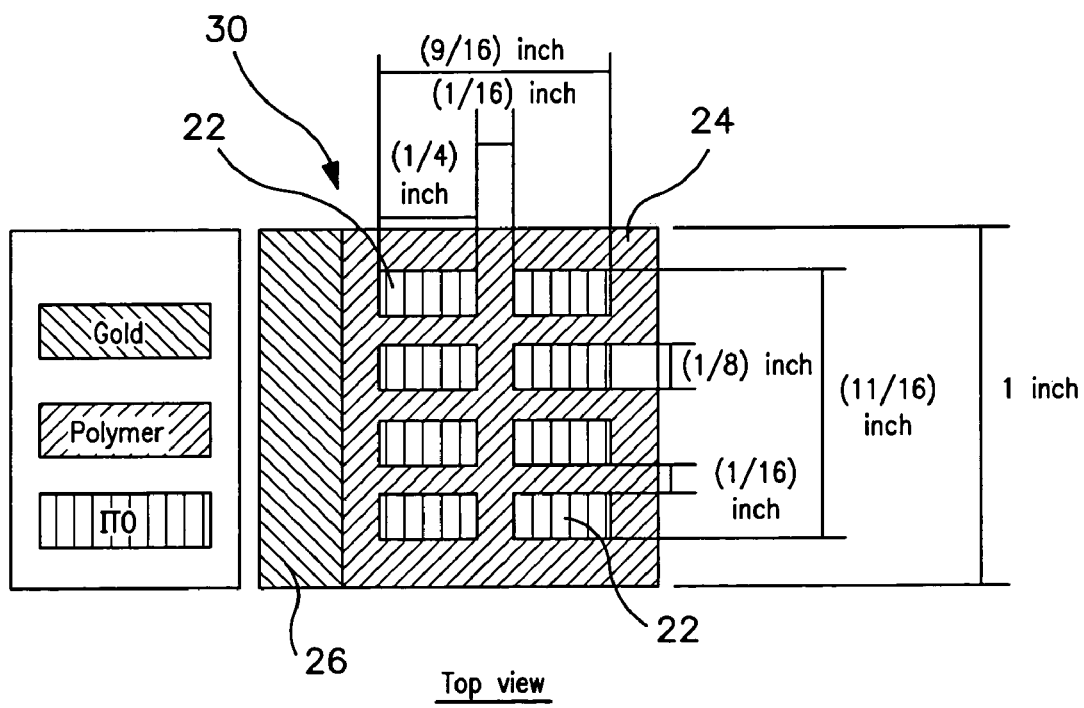
FIGS. 10A and 10B are top and side views, respectively, of a proof of concept addressable grating coupled surface plasmon resonator optical modulator according to aspects of the present invention.
Figure 10B:
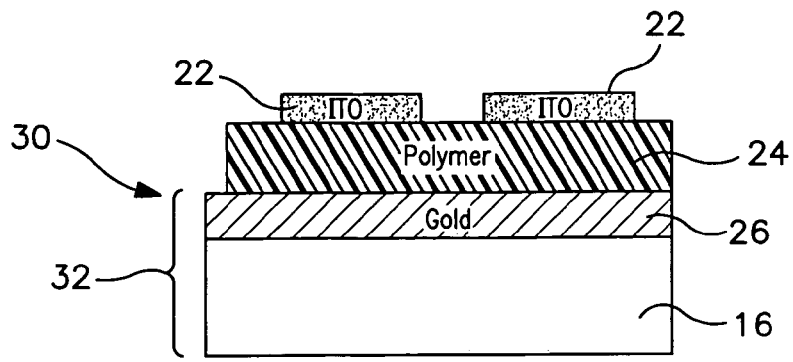
Figure 11:
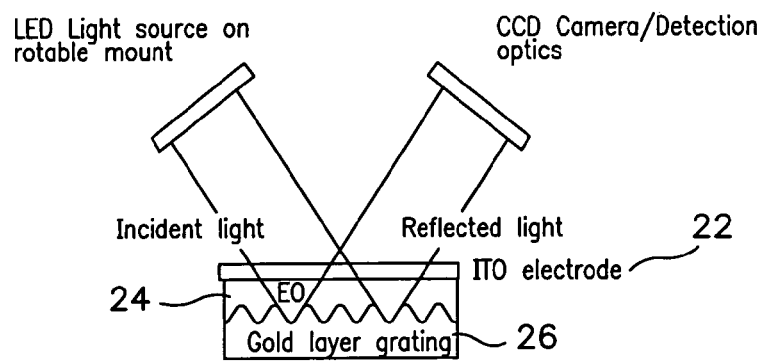
FIG. 11 illustrates measurement of the surface plasmon resonance angle of the proof of concept addressable grating coupled surface plasmon resonator optical modulator of FIGS. 10 and 10B.

A proof of concept experimental electro-optic modulator 30 according to aspects of the present invention is illustrated in FIGS. 10A and 10B. The GCSPR chips 32 were fabricated on a polycarbonate substrate 16 with a grating period of approximately 930 nm, a groove depth of about 50 nm and coated with an 80-nm thick gold layer 26. They were designed for operation at a wavelength of 875-nm and an angle of incidence of 18 degrees through an aqueous buffer. The profile of the grating chips was characterized with atomic force microscopy (AFM). FIG. 7 shows a profile of a typical diffraction grating 12 from the GCSPR chips 32.

Figure 8:
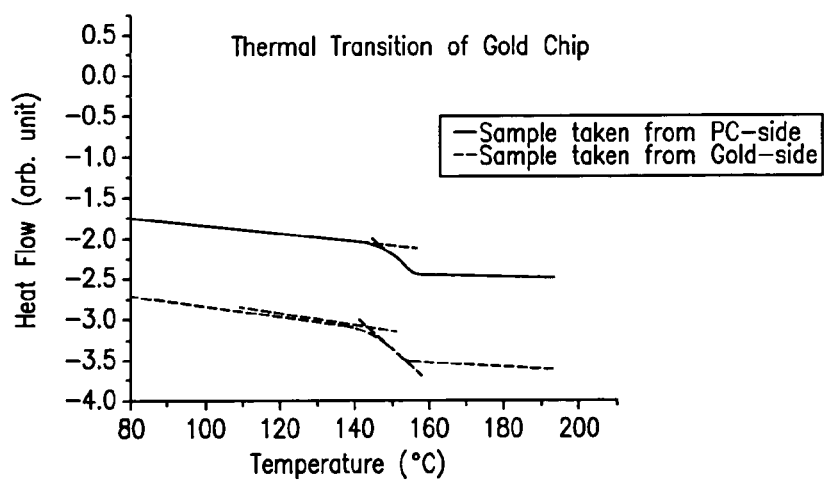
FIG. 8 illustrates the thermal transition of a gold coated polycarbonate chip.
Figure 9:
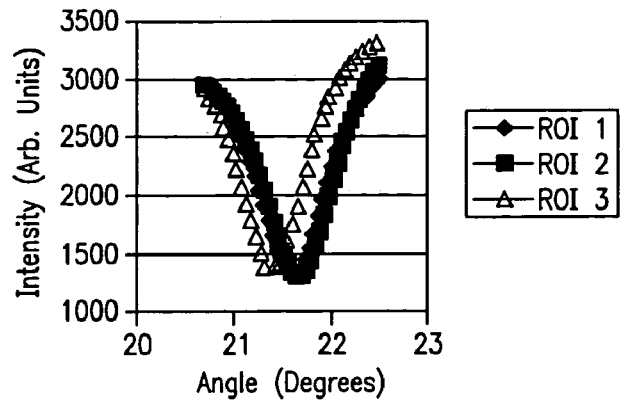
FIG. 9 illustrates the surface plasmon resonance curves corresponding to three regions of interest of a gold coated polycarbonate chip that had been heat treated.

One potential problem with the use of these chips was the compatibility of the polycarbonate substrate with the temperatures necessary for drying the EO polymer and for poling. Drying of the selected EO polymer requires a temperature in the range of 90 to 130° C. for two days, which approaches the glass transition temperature for polycarbonate. Additionally, the polycarbonate is coated with a proprietary liquid resin onto which the grating is formed. No temperature data was available on this resin material. Thus, there was concern that the EO polymer drying process might destroy or distort the grating profile. To investigate this issue the thermal transition of a GCSPR chip was measured using differential scanning calorimetry. Two samples were prepared: one from the backside of a chip, which we considered to be only polycarbonate, and another from the front (gold-coated) side, which consisted of gold, polycarbonate and the liquid resin. Results from these measurements are shown in FIG. 8. The data show that both samples exhibit the thermal glass transition of polycarbonate at approximately 140° C., although the transition temperature of the sample from the front side of the chip is slightly lower. This is consistent with the presence of the resin on the front side. Based on these results a maximum temperature of 130° C. for the EO polymer was selected for the drying process. To verify that this temperature treatment did not adversely affect the grating, a plain GCSPR chip (plain gold surface with no EO polymer or any other type of coating) was baked for two days at 130C and then evaluated it for its ability to produce sharp resonance curves with our GCSPR imaging instrument (using water as the dielectric in contact with the chip surface). Sharp resonances, indistinguishable from those obtained from a control chip, were obtained, as shown in FIG. 9. This confirmed the compatibility of the polycarbonate GCSPR chips with the EO polymer application process.

The electro-optic polymer 24 was deposited on the top of GCSPR chips 32 by a spin-coating method. The polymer was dissolved in cyclohexane (8% by weight %). The resulting solution was filtered through a 0.2 μm filter and was subsequently spin-coated onto GCSPR chips at 2000 rpm for 60 seconds. After deposition, the polymer film was dried in a vacuum oven at 90° C. for 24 hours to remove the residual solvent completely. The thickness of polymer film was 0.1 μm, as determined by a profilometer.

It is contemplated that the EO polymer layer could be deposited by other methods, such as molecular self-assembly. Molecular self assembly of the EO polymer layer could be carried out in such a way as to result in a polarized, or electrically aligned arrangement of molecules in the polymer layer.

Discrete Indium Tin Oxide (ITO) electrodes 22 were deposited on the EO polymer layer 24 in a pattern, as shown in FIG. 10A, using a low-temperature dc magnetron process that results in a conductivity of 50 ohms/sq. or less. ITO deposition was performed by Thin Films, Inc. (NJ). Multiple electrodes 22 were deposited on each chip 32 to permit experimentation with different poling protocols, to cope with potential defects in individual modulator structures and to minimize risk due to the possibility of damage caused by poling. Multiple modulator structures were also useful for characterizing the devices under different conditions with the GCSPR instrument.

In order to exhibit a macroscopic nonlinear optical property, the EO chromophore molecules should be oriented in such a way that the total system does not possess a center of symmetry. In polymer systems, this is achieved by poling, which refers to the alignment of the dipole chromophores by applying a DC electric field. This is most easily accomplished when the polymer is maintained at a temperature where the chromophore dipoles can be readily oriented; i.e., near the glass transition temperature $T_g$. For poling, the EO polymer sandwiched between gold and ITO electrodes was heated to 90° C. where the chromophore dipoles can be readily oriented. Then, an electric field of 50 V/μm was applied across the EO polymer film for 5 min to induce a chromophore orientation along the electric field direction. Finally, the polymer film was slowly cooled to room temperature with the poling-field on to maintain the induced chromophore orientation.

To determine the EO properties of the poled polymer film, a simple reflection method was used. When an electric field of 50 V/μm was applied across the polymer film 24, an electro-optic coefficient ($r_{33}$) of 12 pm/V was observed at 632.8 nm, which is sufficiently high for the modulation of light based on GCSPR. The inventors believe an electro-optic polymer having an electro-optic coefficient of at least approximately 10 pm/V will function in the context of the present invention.

Figure 12:
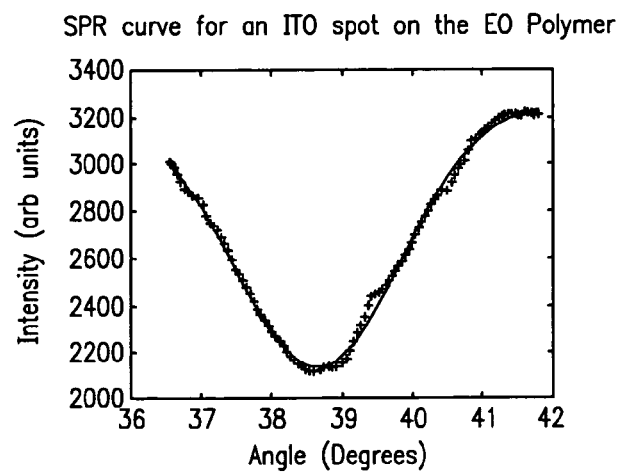
FIG. 12 illustrates the surface plasmon resonance curve for a selected transparent electrode on the proof of concept addressable grating coupled surface plasmon resonator optical modulator of FIGS. 10A and 10B.
Figure 13:
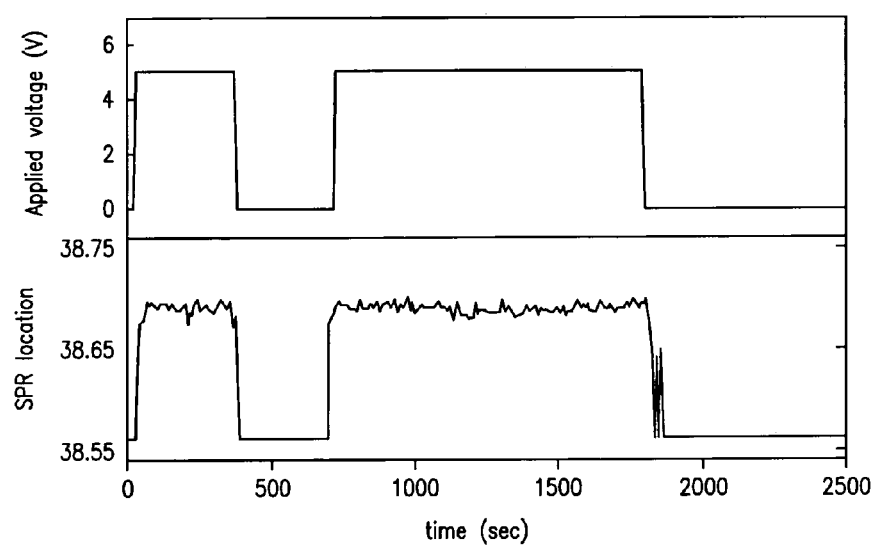
FIG. 13 illustrates an applied voltage and the resulting changes in the resonance angle for a selected transparent electrode of the proof of concept addressable grating coupled surface plasmon resonator optical modulator of FIGS. 10A and 10B.

The GCSPR instrument is an imaging instrument that employs angle interrogation to determine the resonance condition; that is, the angle of incidence of the collimated excitation light is scanned to determine the surface plasmon resonance angle (reflectance minimum). This angle varies with the refractive index at the sensor surface. Applying a voltage to the device electrodes changes the index of refraction of the EO polymer and thus should alter the resonance angle. The principle of the measurement is illustrated in FIG. 13. The angle of incidence of the collimated illumination is mechanically scanned over a narrow range of incident angles (~2 degrees). The resonance condition is determined by the angle at which reflected light exhibits a minimum. As the illumination is scanned in discrete steps, the CCD camera collects a series of images of the chip, with each image containing the reflectance intensity for each spot on the chip, at a given angle. The software allows the image to be segmented into user-defined regions of interest (ROIs), and thus the behavior of individual modulator structures on the chip can be analyzed. Processing the series of captured images with a software algorithm generates an SPR resonance curve for each modulator element in the chip array as shown in FIG. 12. Detecting index of refraction changes of less than $1 \times 10^{-6}$ requires determination of the resonance condition with angular resolution of less than 1 millidegree. In the presently described proof of concept experimentation, only one modulator structure at a time is monitored.

A single 16-mW 870-nm LED (Hewlet Packard HSDL-4400) with collimating optics, a polarizer and a bandpass filter serves as the excitation source. The illumination system (LED plus optics) can be rotated about a horizontal axis perpendicular to the plane of incidence and located along the center of the chip. Rotation is effected with a stepping motor drive in user-selectable angular increments (minimum of 5 millidegrees). The detector is a scientific-grade, cooled, 12-bit, CCD camera (Quantix 1401E) with 1317×1035 pixels (6.8 μm pixels). The achievable resonance angle resolution is a function of the mechanical resolution of the scanning system, the signal-to-noise level of the measurement, and the efficacy of the peak-finding algorithm. Typically, resolution of 1 millidegree is obtained.

This instrument was originally designed for biosensing applications, where the GCSPR chip is immersed in aqueous buffer and the angle of incidence is about 18 degrees. However, in the present experimentation the incident light, rather than traversing an aqueous compartment, must pass through the ITO layer and the EO polymer layer, with an index of refraction of ~1.7, which is considerably higher than that of water. This difference in refractive index at the dielectric-metal interface produces a significant shift in resonance angle, so that the original angular scanning range of the instrument (about 1.5 degrees centered at 18-degree incidence) had to be modified. Based on modeling using a multi-layer slab waveguide model, an approximate angle of incidence of 37.5° was calculated for the EO polymer-coated modulator structures. In addition, the sample compartment was modified to hold the modulator chip prototypes. The instrument was originally designed to hold the biosensor GCSPR chip in a flow cell with a glass window. An aqueous sample containing analyte was then flowed over the chip. For the present application the flow cell was replaced with a platform to hold the chip for direct illumination. This platform was mounted on a goniometer to enable tilting of the chip relative to the incident light and thus permit access to, as well as precise adjustment of, the required illumination incidence angle.

It should be noted that at the 37.5-degree angle of incidence required by the high refractive index of EO polymer, SPR coupling is no longer optimized for the grating periodicity and wavelength used. This is expected to lead to broader and shallower SPR curves (and hence smaller depth of modulation) than would be possible with an optimized system.

Poled chips were examined for SPR coupling. During this study many different modulator spots on multiple chips were studied. A typical GCSPR curve obtained from these devices is shown in FIG. 14. This figure plots the average reflected intensity as a function of illumination angle of incidence calculated by averaging all the pixels in an image ROI corresponding to the modulator structure on the chip being observed. As expected, a reflectance minimum is observed at approximately 38.5°, in reasonable agreement with the modeling calculations. This corresponds to the incidence angle for which the component of the diffracted wave vector along the surface matches that of the surface plasmons. This behavior was observed only with p-polarized light. Illumination with s-polarized light produced no change in reflectance with angle of incidence, as would be expected, since no SPR coupling occurs with s-polarization. Also, as expected, the curves obtained with the EO polymer are broader and shallower than what would be possible with an optimized system. For example, the curve of FIG. 12 shows a decrease in intensity of about 35% at the minimum, with a width (FWHM) of about 2 degrees. In contrast, the curves in FIG. 9, obtained from plain chips at an angle of incidence close to the design angle of 18 degrees, show a width (FWHM) of about 0.7 degrees with an intensity dip of about 62%.

In order to demonstrate light modulation with our device, an electric field was applied to the EO polymer 18 to determine its effect on the SPR condition. As previously discussed, the SPR condition is very sensitive to variation of the refractive index of the dielectric adjacent to the metal layer supporting the surface plasmon wave. In this case, this means that it strongly depends on the variation of refractive index of the EO polymer. More specifically, in our configuration, the evanescent wave that couples energy into the surface plasmons is produced by the diffraction of the incident light by the grating. The x-component (along the metal surface) of the light wave vector, $K_{mdx}$ associated with m-th order diffracted light is given by $$k_{mdx} = \frac{\omega}{c} n_p \sin\theta + mk_g \quad (1)$$

where $\omega$ is the light frequency, c the speed of propagation, $\theta$ is the incidence angle and $k_g$ denotes the grating wave number. The grating wave vector $k_g$ is along the x-direction. The wave vector of the surface plasmons is given by $$k_{sp} = \frac{\omega}{c} \sqrt{\frac{\varepsilon_m n_p^2}{\varepsilon_m + n_p^2}} \quad (2)$$

where $\varepsilon_m$ is the dielectric function of the metal and $n_p$ is the index of refraction of the adjacent dielectric layer, which in this case is the EO polymer. At resonance, $k_{mdx}$, the x-component of the wave vector associated with the diffracted wave of the exciting light must be equal to the wave vector of the surface plasmon. That is, $$\frac{\omega}{c} n_p \sin\theta + mk_g = \frac{\omega}{c} \sqrt{\frac{\varepsilon_m n_p^2}{\varepsilon_m + n_p^2}} \quad (3)$$

As Eq. 3 shows, the incident angle at resonance condition depends on the value of the refractive index of the polymer. At this condition, a p-polarized (electric vector lies in the plane of incidence) incident optical beam excites the surface plasmon. The polarization requirement has to be satisfied because the surface plasmon propagates in the transverse magnetic (TM) mode. The energy of the excited surface plasmon is taken from incident light causing the intensity of the diffracted beam to decrease.

When an EO polymer film of refractive index no and electro-optic coefficient r is subjected to an electric field (E), the refractive index changes by an amount $\Delta n$ given by Equation 4:

$$\Delta n = \frac{n_0^3 rE}{2} \quad (4)$$

Thus, the value of the SPR angle for a given device can be modulated by varying the applied field. We estimated the electro-optic coefficient for our poled polymer to be ~12 pm/V. Thus, applying Eq. 4, and assuming an electric field of $5 \times 10^7$ V/m (5 volts across a 0.1 $\mu$m thickness of polymer), we estimate $\Delta n$ values of the order of $10^{-3}$.

To evaluate the performance of our GCSPR EO modulator structures we monitored the SPR angle of a chip as a voltage of 5 volts was applied between the gold and ITO electrodes. In this mode of operation, the instrument performs repeated angular scans, and for each scan calculates the SPR angle and plots it as a function of time. We conducted numerous experiments with chips that had been poled for varying periods of time and that were examined at varying times after poling. We observed SPR angle shifts in response to a 5-volt potential difference that ranged from 10 mdeg to greater than 100 mdeg, depending on the particular device. FIG. 14 shows the results of one particular experiment.

The results of FIG. 13 show that the SPR angle from the prototype device is modulated by application of an electric field (50V/$\mu$m). The observed changes in SPR angle of 150 millidegrees are consistent with expectations for a change in refractive index of $10^{-3}$.

In this invention, illumination entirely covers an array consisting of obliquely crossing top and bottom conducting electrodes separated by an electro-optic polymer deposited on a grating. The grating is designed to couple the illumination into evanescent mode wave energy in the under electrode. The angle of illumination, the nominal thickness and type of electrode, the nominal index of refraction of the polymer, and the grating comprise an SPR situation. That is, a surface plasmon resonance situation is created whereby each crossing of the electrodes makes a node which is addressed electrically by selection of a bottom electrode and top electrode or electrodes. A proper voltage applied to these electrodes will allow the resonance to be destroyed or modulated so as to control the on or off state of light energy leaving each node. Furthermore, photocells may be incorporated in each electrode so that electrodes may be addressed optically as well. The illumination is compatible with the grating. The optically addressing light is compatible with the photocells, which change their electrical resistance in response to light. A connection path is completed by having appropriate photoreceptive circuitry receive the light ray emanating (or not emanating) from each node.

It is a specific point of this invention that the above can be made compatible with semiconductor wafer processing procedures. For instance, the grating may be formed in the semiconductor wafer, or formed in a polymer coating on the wafer. The illumination can be from an LED or similar on the wafer with a suitable super structure such as a mirror. The photo cells may be deposited on the wafer. In this manner, drive circuitry for the electrodes would be designed in the wafer layout. Several layers of wafers may be involved to achieve a multi dimensional structure.

It is a specific point of this invention that the SPR situation enhances the modulation effect of the polymer by a factor of many tenfold (say $10^4$ or $10^5$). This specifically allows the polymer to undergo some relaxation and still function, providing a long life. This also aids in switching speeds.

It is a specific point of this invention that the electro-optic array interface may couple over great distances, allowing modules to be interconnected in complicated structures.

Such a connecting approach will not be as sensitive to alignment as holographic diffraction schemes.

The proof of concept work described above:

Demonstrated that our gold-coated GCSPR polycarbonate chips were suitable for the modulator fabrication process;

Developed methods for application of EO polymer film to GCSPR chips;

Applied ITO electrodes on top of EO-polymer film on GCSPR substrates to create discrete single channel modulator structures on the chip;

Poled the EO polymer in the single-channel elements of the chip;

Modified a GCSPR imaging instrument to accommodate the measurement conditions required by the EO modulator chips;

Demonstrated GCSPR coupling into the gold surface with incident illumination through the ITO electrode and the EO polymer film; and Demonstrated modulation of GCSPR coupling (and hence reflectance) by varying the voltage applied to the device.

The results demonstrate the feasibility of the invention and lay a solid foundation for product development work. Despite the fact that the grating parameters were not optimized for the devices built, excellent SPR modulation in response to an applied voltage of 5V were obtained. This is an important feature of our proposed SPR approach. Achieving $\pi$-phase shifts (required for full wave modulation) with digital level (less than 6V) drive voltages normally requires a material with a very large electro-optic coefficient. For example, to achieve a $\pi$-phase shift from a 100-nm thick modulator layer at 875 nm (as used in the present study) would require a $\Delta n$ of ~2. In contrast, a similar degree of modulation can be achieved with our GCSPR method with a $\Delta n$ of ~$10^{-2}$. Since the fastest semiconductor electronics operate with digital level voltages (and increasingly with voltages approaching 1 V), the orders-of-magnitude amplification of the index change effect generated by SPR coupling is a major advantage for the production of integrated optoelectronic circuits such as those required for optical switching in LANs, ultrafast A/D conversion, and ultrafast electrical-to-optical signal transduction.

Other advantages include:

High Bandwidth. The low dielectric constants of organic polymers permit large (e.g., greater than 120 GHz for a 1-cm device) bandwidths to be achieved.

High interconnect density. Electro-optic effects tend to be weak in high-speed devices while large effects are obtainable only in slower materials. One way to enhance the degree of light modulation that is obtainable from a given EO effect is to use the active material in a resonantly excited guided mode. The field intensity in the guide can then be much higher than that of the incident beam, and if the mode propagates in some active material, the modulation of the incident beam can be enhanced accordingly. Unfortunately, the degree of enhancement increases with decreasing mode loss; i.e., increasing mode propagation length, and thus, a sensitivity-spatial resolution trade-off occurs. Guided waves are most commonly encountered in low-loss dielectric materials and have propagation lengths of the order of several millimeters or more. Surface plasmons, however, propagate on the surface of a metal, which is a relatively lossy medium and thus has a short propagation length (~20 $\mu$m). This is sufficiently short to allow two-dimensional spatial light modulation to be obtained at high resolution (>10 lp/mm). In terms of an optical interconnect device these characteristics of SPR allow the use of fast EO polymer materials thereby enabling high bandwidth while maintaining high spatial resolution of the order of tens of thousands of pixels per cm$^2$ with very low power densities.

Ease of processability. Spin casting of thin films should be appropriate for most polymeric electro-optic materials. This ease of processability should permit easy integration with semiconductor very large scale integration electronics; better than can be achieved with crystalline materials.

Uniformity. In conventional spatial light modulators the beam must be transmitted through several interfaces and it often encounters a multilayer reflector and also an output polarizer. In prism-coupled SPR devices the beam encounters all three faces of the coupling prism. In contrast, in the proposed grating-coupled SPR optical interconnect device, light modulation is achieved directly by the interaction of the light beam with a thin film on a single interface. This will result in better response uniformity. Another attractive feature is that light modulation occurs within a thin (~0.1 $\mu$m) evanescent field region that is supported by and bound to the metal surface. The response is therefore relatively immune to any thickness variations in the EO layer, which is another source of nonuniformity.

Dynamically reconfigurable. The pattern of optical interconnects is not fixed for a given device but is electronically or optically addressable (depending on implementation design) and dynamically reconfigurable.

Preferred embodiments of the foregoing invention have been set forth for purposes of illustration. The foregoing descriptions should not be deemed limitations of the invention. Various modifications, adaptations and alternatives may occur to one of skill in the art without departing from the spirit or the scope of the present invention.

What is claimed is:

1. A method for manufacturing an electro-optic interface array comprising:

fabricating a diffraction grating on a dielectric substrate;

applying a metallic layer to said diffraction grating, said metal layer acting as a reflecting surface and a first electrode;

depositing a layer of electro-optic polymer on said metallic layer; and forming a transparent second electrode on said electro-optic layer.

2. The method of claim 1, wherein said step of depositing comprises:

providing said electro-optic polymer layer with a net polarization.

3. The method of claim 2, wherein said electro-optic polymer has a glass transition temperature ($T_g$) and said step of providing comprises:

heating said electro-optic polymer to an elevated temperature at least approximately 80% of said glass transition temperature ($T_g$); and poling said electro-optic polymer while said electro-optic polymer is maintained at said elevated temperature.

4. The method of claim 3, wherein said electro-optic polymer includes molecules having a polarity and said step of poling comprises:

applying an electric field to the electro-optic polymer to induce a net orientation of said molecules aligned with said electric field.

5. The method of claim 4, wherein said step of poling comprises:
cooling the electro-optic polymer during said step of applying an electric field.

6. The method of claim 2, wherein said electro-optic polymer includes molecules having a polarity and said method comprises:
exposing said electro-optic polymer to a plasma to induce a net polarization of said molecules.

7. The method of claim 1, wherein said step of depositing comprises:
dissolving said electro-optic polymer in a solvent;
spin-coating said dissolved electro-optic polymer onto said GCSPR chip to form a polymer film; and
drying said polymer film in a vacuum oven to remove residual solvent.

8. The method of claim 1, wherein said diffraction grating comprises parallel microscopic grooves and said step of applying a metal layer comprises:
forming said first electrode as a strip of metal film extending substantially parallel to said microscopic grooves.

9. The method of claim 1, wherein said step of depositing comprises:
employing molecular self-assembly to create an electro-optic layer having a net polarization.

10. The method of claim 1, wherein said diffraction grating comprises parallel microscopic grooves and said step of applying a metal layer comprises:
forming said first electrode as a strip of metal film extending substantially perpendicular to said microscopic grooves.

11. The method of claim 1, wherein said step of applying comprises:
forming said first electrode as a plurality of metal strips having a first orientation; and said step of forming comprises:
forming said second electrode as a plurality of transparent electrode stripes on said electro-optic layer, said plurality of electrode stripes having a second orientation substantially perpendicular to said first orientation.

12. An addressable grating coupled surface plasmon resonance optical interconnect array comprising:
a dielectric substrate defining a diffraction grating;
a first array of electrodes in the form of a plurality of reflective metal strips on said diffraction grating;
an electro-optic polymer layer covering said plurality of metal strips, thereby defining a conductor-dielectric interface between said metal strips and said electro-optic polymer layer, said electro-optic polymer layer having a refractive index which changes in response to an electric field resulting in an electro-optic coefficient of at least approximately 10 pm/V;
a second array of electrodes in the form of transparent conductive stripes on said electro-optic layer, said second array of electrodes being substantially perpendicular to said first array of electrodes; and
an illuminator producing a wavelength of incident light through said electro-optic polymer layer which is grating coupled to a surface plasmon at said conductor-dielectric interface to produce a resonant condition characterized by reduced reflectance of the incident light from said metal strips,
wherein said first and second arrays of electrodes form an addressable grid for applying an electric field to selected portions of said electro-optic polymer layer, said applied electric field altering the index of refraction of the electro-optic polymer layer, thereby disrupting said resonant condition to produce an optically detectable change in the reflectance of incident light from the metal strip beneath said selected portion of electro-optic polymer layer.

13. The addressable grating coupled surface plasmon resonance optical interconnect array of claim 12, comprising:
circuitry for applying an electrical current to electrodes selected from said first and second electrode arrays such that said grating coupled surface plasmon resonance optical interconnect array is electrically addressable.

14. The addressable grating coupled surface plasmon resonance optical interconnect array of claim 12, comprising:
light responsive components arranged to control application of electrical current to each electrode in said first and second electrode arrays such that said grating coupled surface plasmon resonance optical interconnect array is optically addressable.

15. The addressable grating coupled surface plasmon resonance optical interconnect array of claim 12, wherein said dielectric substrate is selected from the group consisting of plastic and silicon.

16. The addressable grating coupled surface plasmon resonance optical interconnect array of claim 12, wherein said incident light is a beam of expanded, collimated transverse magnetic (TM) polarized light.

17. The addressable grating coupled surface plasmon resonance optical interconnect array of claim 12, wherein said electro-optic polymer layer includes molecules having a polarity and said molecules have a net polarization.

18. The addressable grating coupled surface plasmon resonance optical interconnect array of claim 12, comprising photo receptors arranged to detect changes in the reflectance of incident light from said metal strip beneath said selected portion of electro-optic polymer layer.

19. The addressable grating coupled surface plasmon resonance optical interconnect array of claim 12, wherein said illuminator is selected from the group consisting of a light emitting diode (LED) and a laser diode.

20. A light modulator comprising:
a dielectric substrate defining a diffraction grating;
a metal layer on said diffraction grating;
an electro-optic polymer layer on said metal layer;
a transparent electrode on said electro-optic polymer layer;
a circuit arranged to selectively apply an electrical potential between said metal layer and said transparent electrode;
an illuminator producing a wavelength of light incident upon said metal layer after passing through said electro-optic polymer layer, said light being grating coupled to a surface plasmon on said metal layer to produce a resonant condition characterized by reduced reflectance of the light from said metal layer;
wherein application of an electrical potential between said metal layer and said transparent electrode alters the index of refraction of the electro-optic polymer layer, thereby disrupting said resonant condition to modulate reflectance of light from the metal layer.

* * * * *